T. H. ARMSTRONG.
GAS GENERATOR.
APPLICATION FILED JULY 11, 1912.

1,079,091.

Patented Nov. 18, 1913.
2 SHEETS—SHEET 1.

Witnesses
Romaine W. Slone
A. A. Olson

Inventor
Thomas H. Armstrong,
By Joshua H. Potts
his Attorney.

T. H. ARMSTRONG.
GAS GENERATOR.
APPLICATION FILED JULY 11, 1912.

1,079,091.

Patented Nov. 18, 1913.
2 SHEETS—SHEET 2.

Witnesses
Romaine W. Stone
A. A. Olson.

Inventor.
Thomas H. Armstrong.
By Joshua R. H. Potts
his Attorney.

COLUMBIA PLANOGRAPH CO., WASHINGTON, D. C.

UNITED STATES PATENT OFFICE.

THOMAS H. ARMSTRONG, OF CHICAGO, ILLINOIS, ASSIGNOR TO SOLOMON PEARLMAN, OF CHICAGO, ILLINOIS.

GAS-GENERATOR.

1,079,091.  Specification of Letters Patent.  Patented Nov. 18, 1913.

Application filed July 11, 1912. Serial No. 708,771.

*To all whom it may concern:*

Be it known that I, THOMAS H. ARMSTRONG, a citizen of the United States, and a resident of the city of Chicago, county of Cook, and State of Illinois, have invented certain new and useful Improvements in Gas-Generators, of which the following is a specification.

My invention relates to gas generators and more specifically to that class thereof designed for the production of a very hot flame.

The object of my invention is the production of gas generating apparatus of the character mentioned which will be durable and economical in construction, efficient in operation and which may be controlled and regulated easily and readily.

Other objects will appear hereinafter.

With these objects in view my invention consists in the combinations and arrangements of parts hereinafter described and claimed.

The invention will be best understood by reference to the acompanying drawings forming a part of this specification and in which,—

Figure 1:
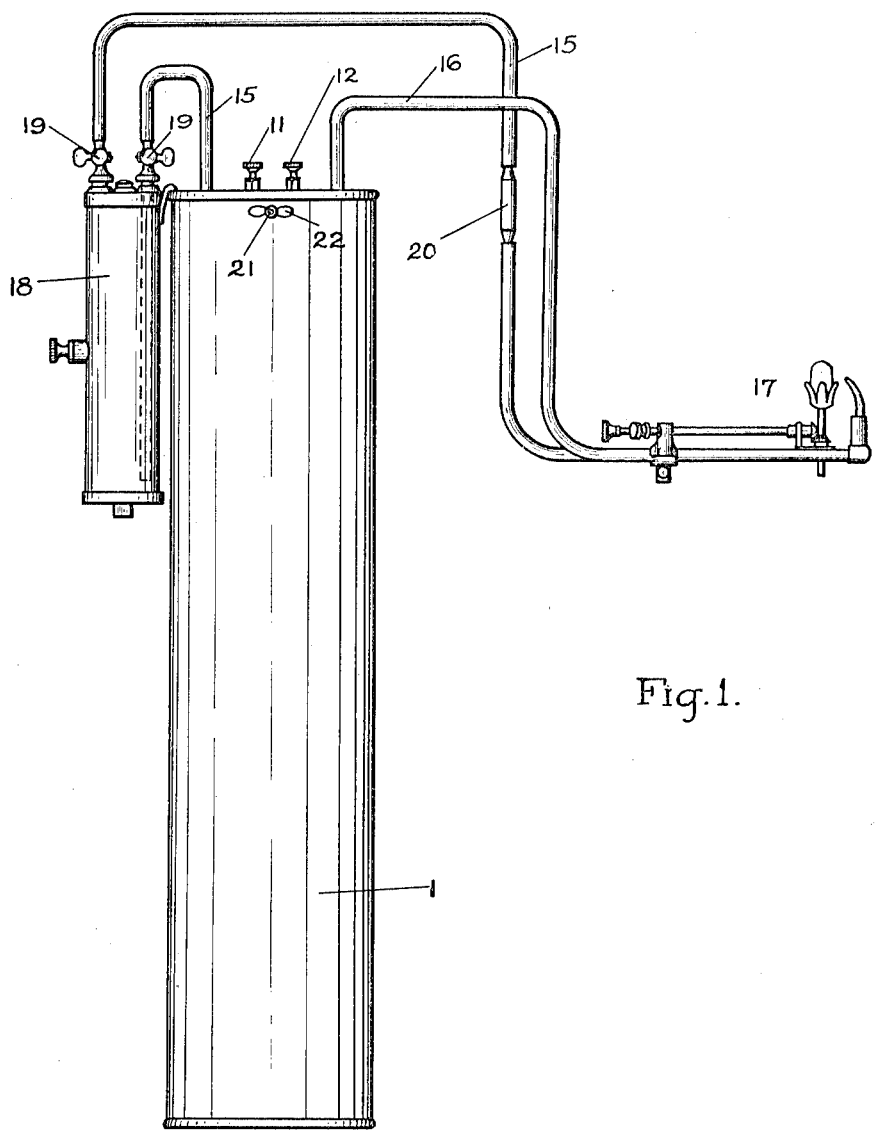
Figure 4:
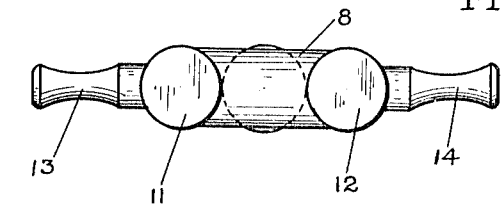
Figure 3:
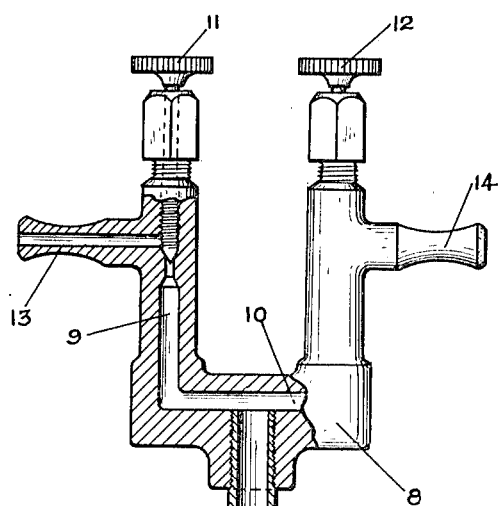
Figure 3:
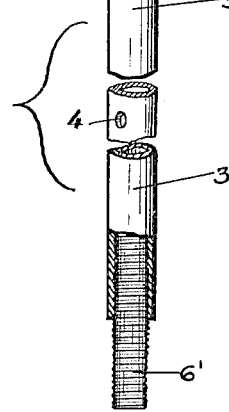
Figure 2:
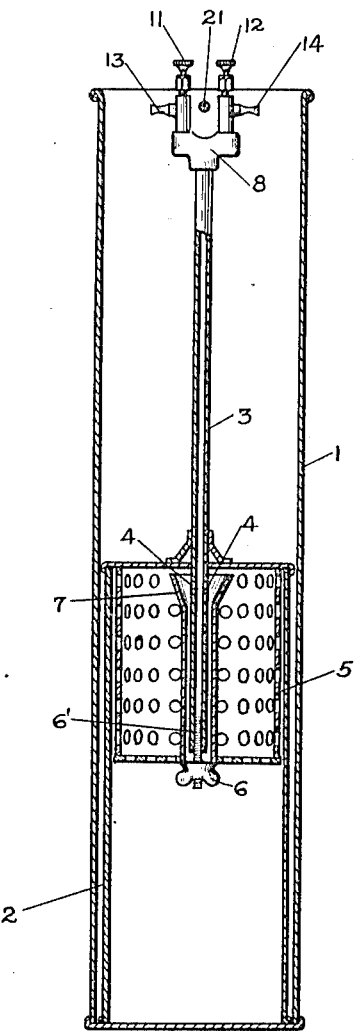

Figure 1 is a side elevation of a gas generator embodying my invention, Fig. 2 is a central vertical section of the oxygen generator of the construction shown in Fig. 1, Fig. 3 is an enlarged sectional side elevation of the gas outlet pipe included in the construction shown in Fig. 2, and Fig. 4 is a top plan view of the construction shown in Fig. 3.

The preferred form of construction as illustrated in the drawings comprises an oxygen generator consisting of a cylindrical vessel 1 which is open at its upper end. Arranged within the vessel 1 at the lower end thereof is a vertically movable cylindrical vessel 2, the latter being inverted, the lower end thereof being open. Leading from the upper end of vessel 2 is the gas outlet pipe 3, the lower end of said pipe being secured to the upper end of vessel 2, said end of said pipe projecting into the vessel 2 a considerable distance as will be seen. Provided in the pipe 3 are diametric openings 4 which establish communication between the upper end of vessel 2 and the passage or interior of pipe 3. The upper end of said vessel 2, when the apparatus is in operation, constitutes the gas chamber, the gas generated in the vessel 2 passing upwardly therein, accumulating at the upper end thereof. Hence openings 4 establish communication between the gas chamber and the interior pipe 3 which in turn serves as the gas outlet pipe.

Arranged in the upper end of vessel 2 is the chemical container 5 in which, when the device is in operation, the solid chemical, such as ozone or oxylithia, is provided to effect the generation of oxygen when reacting with water which is introduced into vessel 1 and which rises in the lower end of vessel 2 into contact with the chemical contained in the container. The latter is foraminated as will be observed, to permit of free passage of water, said container being secured to the lower end of pipe 3 by means of a thumb nut 6 which is threaded upon a screw plug 6' provided in the lower end of said pipe, as clearly shown in Fig. 3. The arrangement is such, as will be observed, that container 5 will be securely held between nut 6 and the upper wall of vessel 2. Container 5 is formed with an axial tubular portion 7 to accommodate the lower end of pipe 3, the upper end of tubular portion 7 being flared, as clearly shown in Fig. 3, to facilitate the insertion of pipe 3 into said tube, in assembling the device.

Through the employment of tube 7 it will be seen that in using the device, when the container is filled with the chemical, a passage will be provided through the same by said tube and thus serve to facilitate insertion of the lower end of the pipe 3 into said container.

Provided at the upper end of pipe 3 is a fitting 8 in which are formed two passages 9 and 10 which communicate with the upper end of pipe 3 as clearly shown in Fig. 3. The passages 9 and 10 are controlled by manually adjustable needle valves 11 and 12 respectively. The outer ends of passages 9 and 10 are formed with nipples 13 and 14 respectively for connection with flexible tubes 15 and 16 respectively, which communicate with a burner 17 which may be of any conventional or preferred design. Interposed in pipe 15 is a carbureter 18 in which, when the device is in use, ether or other similar liquid chemical is contained to effect the carburation of the oxygen passing through pipe 15. Suitable valves 19 are provided for controlling the flow of gas to and from said carbureter. Also interposed in pipe 15 is a safety device 20 of conventional construction which serves to arrest sparks passing rearwardly in pipe 15 and thus preclude the possibility of an explosion which might otherwise result by reason of a spark passing rearwardly through pipe 15 into the carbureter.

In the operation of the device the container 5 is first supplied with the desired solid chemical. Said container is then arranged in vessel 2, whereupon the latter is inserted into vessel 1 to the position shown in Fig. 2. Water is then introduced into vessel 1 causing the immersion of vessel 2, the water thus introduced rising in the said vessel 2 into contact with the chemical contained in container 5. The reaction of the water and the solid chemical effects the generation or liberation of oxygen which accumulates in the upper end of vessel 2. The gas thus generated escapes from the vessel 2 into pipe 3 through openings 4 whence a portion of the gas passes through carbureter 18 and thence to the burner, and another portion through pipe 16 to the burner where the two gases are mixed to form a highly combustible mixture. The burner 17 is preferably provided with a holder for a lime pencil against which the flame impinges heating said pencil to incandescence in the manner as will be understood by those skilled in the art.

In the generation of gas in the vessel 5, the increase in pressure in the upper end of said vessel caused by the accumulation of gas generated, will cause the elevation of said vessel, such upward movement of the latter being limited by a transversely extending pin 21 which is adapted to contact with the upper side of fitting 8. A thumb nut 22 threaded upon one end of member 21 secures the latter in position. The vessel 2 being thus limited in its upward movement, further increase in the pressure therein will cause the water contained in the lower end of said passage to be forced therefrom around the lower edges of said vessel and upwardly in vessel 1, the water, contained in vessel 1, thus serving as a means of automatically regulating the pressure in the vessel 5 and so that the gas escaping through the pipe 3 and which is delivered to the burner for combustion will be constantly of uniform pressure.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. A gas generator comprising a vessel, a second vessel loosely arranged within said first vessel and having its lower end open; a gas outlet pipe leading from the upper end of said second vessel; a stop at the upper end of said first vessel adapted to releasably engage against the upper end of said outlet pipe for releasably locking said second vessel in position; and a foraminated container mounted within said second vessel, substantially as described.

2. A gas generator comprising a vessel; a second vessel loosely arranged within said first vessel and having its lower end open; a gas outlet pipe leading from the upper end of said second vessel; a transversely extending stop bar removably arranged in the upper end of said first vessel and adapted to limit the upward movement of said second vessel; and a foraminated container mounted within said second vessel, substantially as described.

3. A gas generator comprising a vessel; a second vessel loosely arranged within said first vessel and having its lower end open; a gas outlet pipe leading from the upper end of said second vessel, said pipe being bifurcated at its upper end; and a transversely extending rod removably secured across the upper end of said first vessel and disposed between the arms of the bifurcated end of said pipe limiting the upward movement of said second vessel and said pipe, substantially as described.

In testimony whereof I have signed my name to this specification in the presence of two subscribing witnesses.

THOMAS H. ARMSTRONG.

Witnesses:
A. A. OLSON,
JOSHUA R. H. POTTS.

Copies of this patent may be obtained for five cents each, by addressing the "Commissioner of Patents, Washington, D. C."